United States Patent
Van Horenbeeck et al.

(10) Patent No.: US 9,960,975 B1
(45) Date of Patent: May 1, 2018

(54) ANALYZING DISTRIBUTED DATASETS

(71) Applicant: Amazon Technologies, Inc., Seattle, WA (US)

(72) Inventors: Maarten Van Horenbeeck, Seattle, WA (US); Matthew Ryan Jezorek, Maple Valley, WA (US)

(73) Assignee: Amazon Technologies, Inc., Seattle, WA (US)

( * ) Notice: Subject to any disclaimer, the term of this patent is extended or adjusted under 35 U.S.C. 154(b) by 542 days.

(21) Appl. No.: 14/533,905

(22) Filed: Nov. 5, 2014

(51) Int. Cl.
*H04L 29/06* (2006.01)
*H04L 12/26* (2006.01)

(52) U.S. Cl.
CPC .............. *H04L 43/06* (2013.01); *H04L 43/04* (2013.01); *H04L 63/1416* (2013.01)

(58) Field of Classification Search
CPC ...... G06F 21/55; G06F 21/552; G06F 21/554; G06F 21/566; G06F 21/6209; G06F 21/6227
See application file for complete search history.

(56) References Cited

U.S. PATENT DOCUMENTS

| | | | |
|---|---|---|---|
| 7,450,006 B1 * | 11/2008 | Doyle | G08B 13/122 340/10.1 |
| 7,779,119 B2 * | 8/2010 | Ginter | G06F 21/55 709/219 |
| 8,626,904 B1 * | 1/2014 | Olliff | G06F 9/524 709/224 |
| 8,779,921 B1 * | 7/2014 | Curtiss | G08B 25/009 340/506 |
| 2005/0097386 A1 * | 5/2005 | Datta | A63F 13/12 714/4.3 |
| 2006/0059557 A1 * | 3/2006 | Markham | G07C 9/00158 726/22 |
| 2014/0215616 A1 * | 7/2014 | Bhatt | G06F 21/554 726/23 |

* cited by examiner

*Primary Examiner* — Tri Tran
(74) *Attorney, Agent, or Firm* — Kilpatrick Townsend & Stockton LLP (57) ABSTRACT

Techniques for analyzing a dataset may be provided. For example, a configuration file may be accessed. The dataset may be analyzed based on a condition identified in the configuration file. A report may be generated and transmitted based on the analysis. Another report generated based on an analysis of another dataset according to another configuration file may be accessed. The dataset may be further analyzed based on this report to determine if a reported observation may also be associated with the dataset. If so, a confirmation may be generated and transmitted.

20 Claims, 7 Drawing Sheets

ANALYZING DISTRIBUTED DATASETS

BACKGROUND

More and more users are turning to network-based resources to access information and conduct transactions. For example, an electronic marketplace may allow users to review, order, and/or return items. Such an electronic marketplace may provide a user experience unmatched by a more traditional brick and mortar store. For example, the electronic marketplace may offer a larger and more diverse selection of items.

A network-based resource may be a resource in a network of computing resources and may be configured to provide certain services. As the number and type of services provided by the network may increase, the amount of associated data may also increase.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, improving services provided by a network. Specifically, a service provider may operate a network of computing devices to provide various services to users. Data associated with the services may be analyzed for multiple reasons. For example, the service provider may analyze certain data to determine whether the network may be under a network-based attack, or for other reasons. By performing this analysis, the service provider may enhance the security and resilience of the network. As the network and/or services may grow, the amount of data may become too large to effectively analyze as a single dataset in a centralized location (e.g., database). Instead, the data may be distributed or decentralized such that each computing device, or a subset of the computing devices, may store and locally analyze corresponding data. To further improve the local analysis, correlations between results of the analysis may be performed. For example, if a computing device detects, from its local data, a particular suspicious behavior, the computing device may report this behavior to other computing devices. In turn, a receiving computing device may determine whether this suspicious behavior may also be observed in its local data and may, accordingly, generate a message. A correlation across the distributed data may be generated from the various messages to qualify the behavior. For example, if a larger number or a number over a certain threshold of computing devices confirm that the behavior is also locally observed, the behavior may be qualified as a normal behavior. However, if only a small number of computing devices observed the behavior, this correlation may indicate a network-based attack or some other security-related issue associated with these computing devices. In some cases, that may be because the behavior may not be common across the network.

To illustrate, an administrator may manage a network of a large number, in the thousands or more, of servers providing various services to clients. Some or all of the servers may log their activities. Among this large network, there may also be a large number, in the hundreds or more, of web servers configured to provide web-based services. Accordingly, the web servers may locally log data associated with client access including, for example, Hypertext Transfer Protocol (HTTP) requests to the web servers. The administrator, operating a computing device, may generate a file to investigate a certain behavior. The file may specify that a server should check various parameters. For example, the file may specify three parameters: (1) determine if local data includes HTTP requests, (2) generate a fuzzy hash of these requests, and (3) report any fuzzy hash that may be dissimilar by a certain degree from other fuzzy hashes. The computing device may flood the network with the file. In turn, out of all of the servers, only the web servers may respond because the corresponding local data may include HTTP requests. Out of the web servers, one or more web servers may generate a report including dissimilar hashes based on the associated local data. That web server may flood the report back on the network for correlation. Another web server may then respond with a message indicating that the behavior (e.g., one or more of the dissimilar hashes) may be locally observed. This can be the case when, for example, fuzzy hashes of HTTP requests local to the responding web servers may be the same or similar, within a certain degree, to the reported dissimilar hashes. Depending on the number of messages (e.g., the number of web servers that may have observed the behavior), a determination may be made regarding whether a network attack exists. For example, if the number is over a threshold (e.g., 5%), no attack may be occurring. Otherwise, an attack may identified when the behavior is not common to the various servers in the network.

As such, the overall network's security and resilience to attacks may be improved by detecting a behavior in one web server and correlating the behavior to observations in other web servers. Further, the local investigation and cross-server correlation may improve the efficiency of querying data. For example, there may not be a need to move the decentralized data to a centralized database and query the centralized database.

In the interest of clarity of explanation, various embodiments and illustrative examples are described in the context of analyzing datasets of web servers to determine network-based issues, such as access and security related issues.

Nevertheless, the embodiments may be similarly applied to any type of network-based resource to analyze associated data and detect a certain behavior. These and other functions are further described herein below with reference to the figures.

Figure 1:
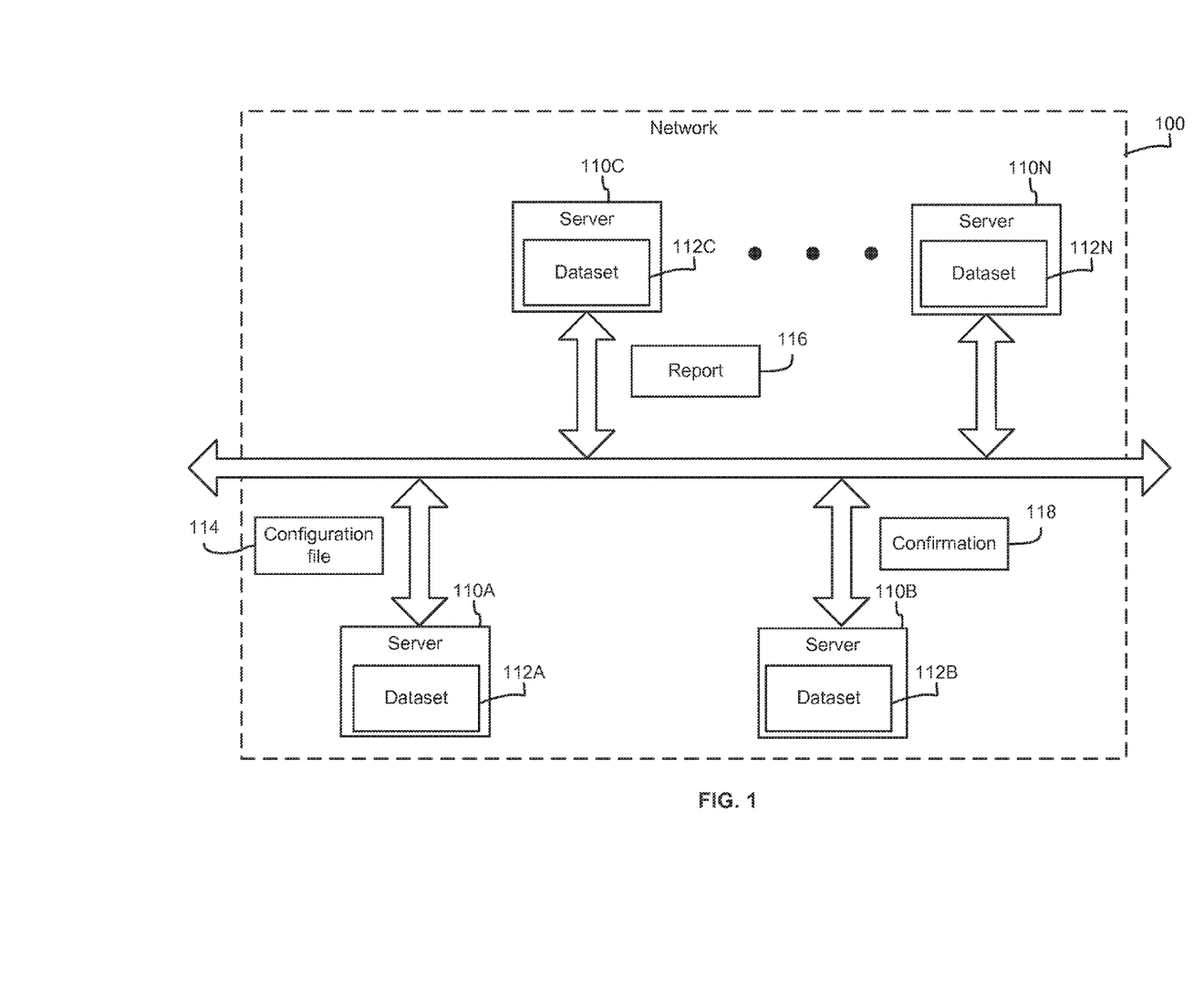
FIG. 1 illustrates an example network of computing nodes, according to embodiments.

Turning to FIG. 1, that figure illustrates an example network 100 that may include a number of computing devices, such as servers 110A-110N. This number can be large, in the thousands or more. Each of the servers 110A-110N may be a computing node in the network 100 configured to provide various types of services. Each node may be accessible directly to client devices over a public network and a public interface thereto or indirectly through another node in the network 100. The network 100 may represent a private network used by the servers 110A-N to exchange communications. For example, the servers 110A-N may use the network 100 to communicate various types of data. As further described herein below, the communicated data may include configuration files, reports, and confirmations to analyze and cross-correlate locally observable behaviors. As such, the network 100 may represent a physical network or may be a virtual network laid over an existing physical network configured to enable such communications. For example, the network 100 may include a virtual private network (VPN) that may use an underlying public network.

Regardless of the underlying structure, the network 100 may be configured according to various topologies. For example, the servers 110A-N may be set-up for point-to-point communications. In another example, a one-to-many topology may be used, where one server may communicate with multiple other servers. In yet another example, a broadcast or multicast configuration may be used, where one server may broadcast data on the network 100, and where that data may be received by all (broadcast) or a subgroup (multicast) of the servers.

Which topology to use may depend on various factors including bandwidth, time, resources, and other network-related factors. For example, a point-to-point topology may use, on one hand, a small amount of bandwidth and, on the other hand, a large amount of time for a communication to be distributed to all the servers. In comparison, a broadcast topology may use a larger amount of bandwidth, but may reduce the amount of time for distributing the communication. As such, if the network 100 may already be or expected to be constrained because of other supported services, a point-to-point topology may be used to enable the servers to analyze and cross-correlate locally observable behaviors.

Each of the servers 110A-N may represent a computing node in the network 100 configured to provide one or more types of services. A computing node may be implemented on a wide variety of computing environments, such as commodity-hardware computers, virtual machines, computing clusters and computing appliances. Any of these computing devices or environments may, for convenience, be described as a computing node. An example configuration of a server is further illustrated in FIG. 2.

Services of any of the servers 110A-N may be provided to client devices or to other servers within the network 100. These services may be associated with local datasets 112A-N. In other words, each of the servers 110A-N may store, manage, or otherwise operate its own local dataset. A local dataset of a server may include data to facilitate or support a portion or all of the services provided by the server and may represent a local database to the server. For example, if the server 110A represents a web server, its corresponding local dataset 112A may include logs of web requests. Similarly, if the server 110B represents a block storage server, its corresponding local dataset 112B may represent data blocks. These two examples are provided for illustrative purposes only. Other types of servers and datasets may exist.

In other systems, to analyze the data within the network 100, the local datasets 112A-N may typically be transmitted to a central database for analysis. Once transferred, queries, such as SQL queries, and other database techniques may be submitted to the central database. Accordingly, various considerations, including resources and scale, should be examined before implementing such system. For example, transmitting the distributed datasets to a local database may consume bandwidth and resources that may be, otherwise, unavailable or better suited to provide other types of services. Similarly, each dataset may include thousands and thousands of fields. Accordingly, by centralizing the data, the resulting data size may be too large to efficiently analyze.

Instead, and as further described herein, the servers 110A-N can be configured to locally analyze the corresponding local data sets and to cross-correlate the results of the analysis to confirm a particular behavior. As such, the datasets 112A-N need not be centralized and can remain distributed or decentralized across the network 100. This type of analysis may efficiently detect the particular behavior and may, thereby, improve the overall network resilience.

Figure 2:
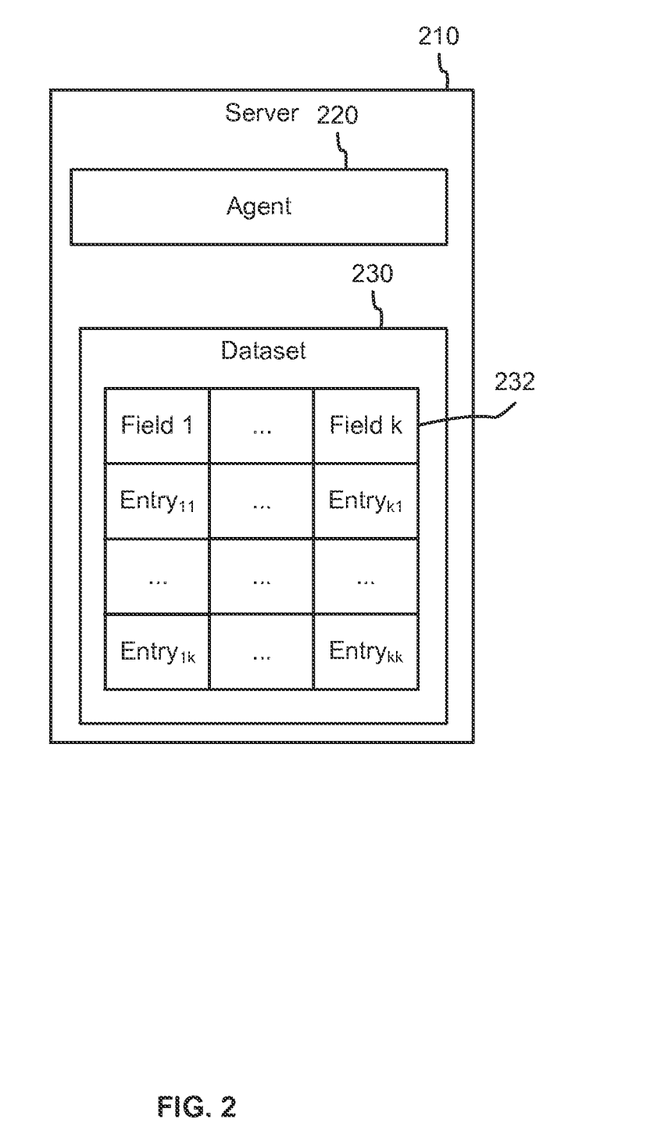
FIG. 2 illustrates an example computing node of a network, according to embodiments.
Figure 3:
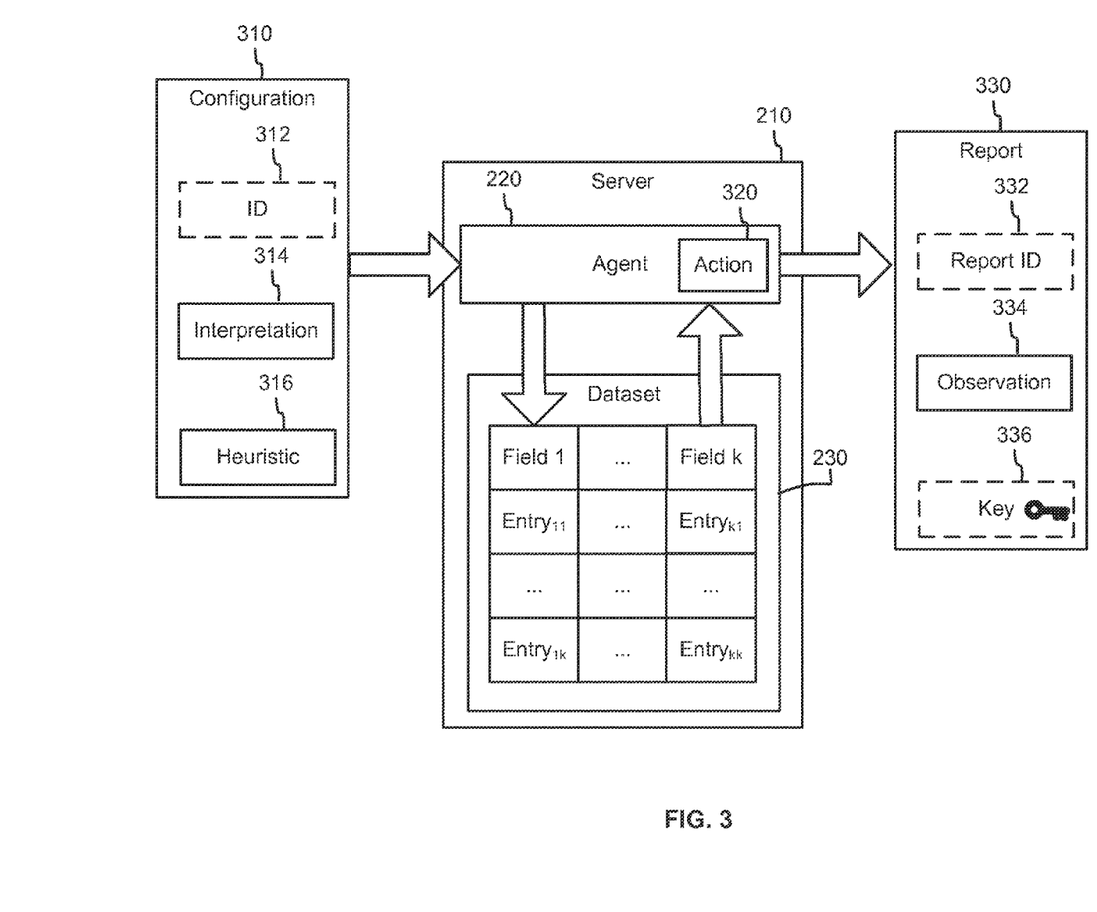
FIG. 3 illustrates an example configuration file and report associated with a computing node of a network, according to embodiments.
Figure 4:
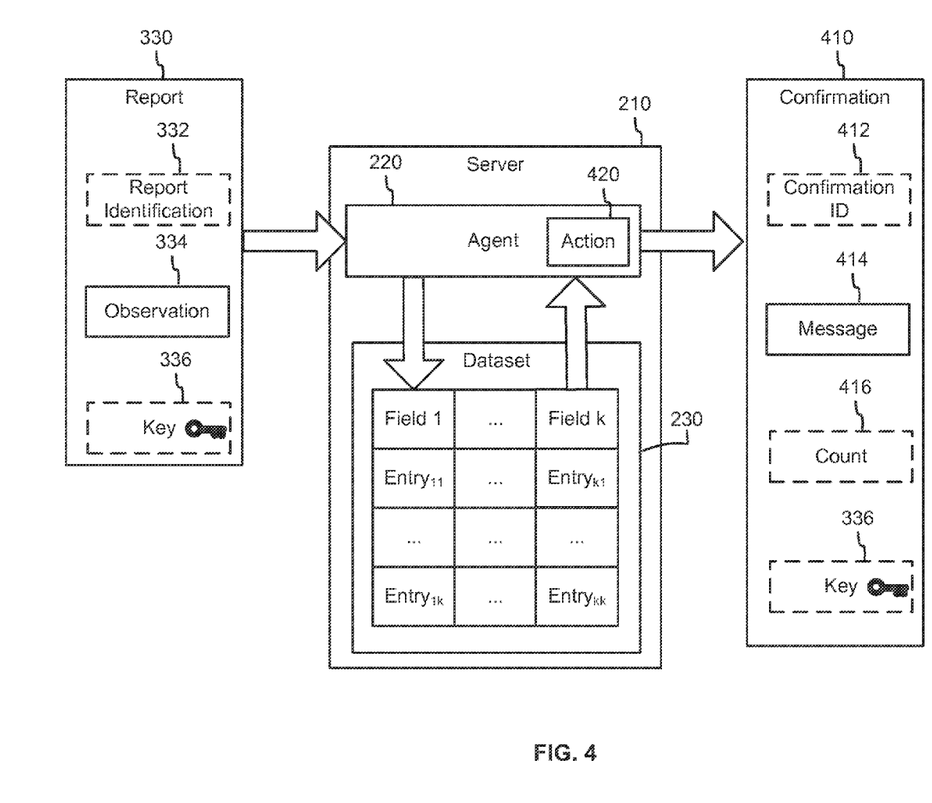
FIG. 4 illustrates an example report and confirmation associated with a computing node of a network, according to embodiments.

To perform the analysis, each of the servers 110A-N may implement an autonomous agent to analyze its local dataset as further illustrated in FIGS. 2-4. The analysis may include using a configuration file 114, a report 116, and a confirmation 118. These components are further described in FIGS. 3-4. Briefly, the configuration file 114 may represent an electronic document of any format or type configured to trigger an analysis of a certain behavior. For example, the configuration file 114 may define various heuristics for analyzing the datasets 112A-N. The report 116 may be generated by a server in response to analyzing is local dataset based on the configuration file 114 received from another server. The report 116 may represent an electronic document of any format or type and may include, for example, data indicating a result of the analysis. The result may represent an observed behavior. The confirmation 118 may be generated by a server in response to analyzing its local dataset based on the report 116 of another server. The confirmation 118 may represent an electronic document of any format or type and may include, for example, data indicating whether the result in the received report 116 (e.g., the observation of the other server) may be also observed in the local dataset of the server.

To illustrate, the server 110A may be set as a privileged computing node within the network 100. A privileged computing node may represent a node configured to provide various functions associated with analyzing datasets. For example, a privileged computing node may be able to launch an analysis of the datasets based on a configuration file, terminate the analysis, initiate another analysis, and/or initiate corrective actions. As further described in FIGS. 3-4, keys associated with the privileged computing node may be used to facilitate some or all of these functions.

As such, the server 110A may distribute a configuration file 114 to the remaining servers 110B-N of the network 100. Each of the servers 110A-N may analyze the corresponding local datasets 112A-N to determine if a certain behavior may be observed based on the configuration file 114. If so, a server may generate a report 116 summarizing a result of the analysis. As illustrated in FIG. 1, for example, out of the servers 110A-N, the server 110C may observe such behavior and, accordingly, generate the report 116. In this illustrative example, the remaining servers may not have observed the behavior and, thus, may not generate reports. In turn, the server 110C may distribute the report 116 to the remaining servers of the network 100. Each of these remaining servers may then determine whether the result from the report 116 may be observed in the corresponding datasets. If so, a confirmation 118 may be generated. As illustrated in FIG. 1, for example, out of the servers 110A-N, the server 110B may confirm the result summarized in the report 116 by transmitting the confirmation 118. In this illustrative example, the remaining servers may not have observed the behavior and, thus, may not generate confirmations.

Based on the communications between the servers 110A-N, the privileged server 110A may receive the report 116 from the server 110C and the confirmation 118 from the server 110B. Accordingly, the privileged server 110A may determine that out of all of the servers 110A-N, only two servers may have observed the behavior. The privileged server 110A may compare this number (e.g., two) to a threshold. Because the behavior is unique to two out of the thousands of servers, the privileged server 110A may determine that a network-related issue may exist. For example, the two servers may be under a network attack.

As such, rather than centralizing the data, decentralized datasets may be analyzed and results can be correlated to detect a certain behavior. Based on the correlation, such as the extent of the behavior, a determination can be made as to whether a network-related issue may exist or not. Corrective actions may be initiated including, for example, performing further analysis and/or voiding traffic to impacted servers.

Turning to FIG. 2, that figure illustrates an example configuration of a computing node with the network 100, such as a server 210. In particular, the server 210 may include an agent 220 and a dataset 230, among other modules. The agent 220 may be implemented in hardware, or in computer-readable instructions that, when executed on a processor of the server 210, cause the server to perform a number of functions. The agent 220 may operate autonomously of other agents implemented on other servers of the network 100. Operating autonomously may include performing a set of operations independently of the operations of the other agents. For example, the agent 220 can be configured to perform local investigations on the dataset 230 based on a set of criteria distributed across the network 100 in a configuration file. This local investigations can be performed independently of other investigations performed by the other agents. Results of the analysis can be shared across the network 100 with the other agents in, for example, a report. Accordingly, the agent 220 may also receive a report from another agent and may further investigate the dataset 230 to determine whether a reported behavior may also be observed in the dataset 230. Here again, the agent 220 may share the results of this further analysis across the network 100 with the other agents in, for example, a confirmation. This may allow the autonomous agent 220 to share data with other agents that may be of interest and to, essentially, confirm or disconfirm hypothesized observations from the other agents.

As such, by implementing an autonomous agent on each server or subset of servers within the network 110, these servers can manage the collection and identification of local anomalies. The servers can then share the anomalies for correlation and, accordingly, confirm or disconfirm whether a network-related issue associated with the anomalies may exist.

Turning to the dataset 230, that dataset may include a large number of entries, in the thousands, millions, or even more. The entries may be organized in fields 232. For example, a dataset of a web server may represent logs associated with client web requests. Each log may include a number of entries and a larger number of logs, thousands or more, may be generated and recorded in the dataset on a timely basis (e.g., hourly or daily). These entries may be organized in, for example, source IP address, destination IP address, service, action, and/or other fields. The agent 220 may analyze certain entries and generate a report according to a configuration file. For example, the configuration file may indicate which entries should be analyzed by specifying a particular field(s) and a type of the analysis. Similarly, the agent 220 may analyze certain entries and generate a confirmation according to a report or an associated configuration file. For example, if the report includes hashes of source IP addresses, the agent 220 may generate and compare hashes of the source IP addresses from the dataset 230 to the reported hashes. In another example, if the report is identified as associated with a particular configuration file, and that configuration file indicates an analysis of source IP addresses, the agent 220 may similarly analyze these addresses in the dataset 230.

As such, the agent 220 may analyze the dataset 230 based on a configuration file to detect an anomaly or a certain behavior. Similarly, the agent 220 may analyze the dataset 230 based on a report to confirm or disconfirm a reported anomaly or behavior. Allowing this type of local analysis may avoid the need to transmit the entries from the dataset 230 to a central database for analysis. Further, by analyzing the dataset 230, rather than a very large central database, an efficient and effective analysis may be obtained.

To illustrate, there may be a large number of web servers and other types of servers within the network 100. Each of the servers may get flooded with a generic configuration file. This configuration file may specify that, for example, if a server has HTTP logs with a source IP address field, an initial analysis of the logged source IP addresses should be conducted to determine a behavior (e.g., how similar or dissimilar associated fuzzy hashes may be). The configuration file may also specify that, if this initial analysis results in hits, that behavior should be flooded through the network to all the other servers to confirm whether the behavior may be common or not. As such, the server 210 may generate a report indicating that the behavior may be observed from the dataset 230 and/or may generate a confirmation that a particular behavior reported from another server may also be observed in the dataset 230.

In an embodiment, the server 210 may be further designated as a privileged computing node. As such, in addition to analyzing the dataset 230 based on configuration files and/or reports, the server 210 may perform various additional functions related to detecting certain behavior. In comparison, other unprivileged servers of the network 100 may not be able to perform such functions. The functions may include generating a configuration file, initiating a transmission of the configuration file to the servers of the network 100, launching an analysis of the datasets based on a configuration file and/or a report, terminating the analysis, initiating another analysis, collecting certain analysis data, and/or initiating corrective actions.

To designate the server 210 as a privileged computing node, keys of the server 210 may be used. In particular, a public key infrastructure (PKI) may be used, where the various server of the network may receive certificates as part of the PKI. When initiating an analysis using the server 210, a configuration file may specify that reports and/or confirmations should be signed with a public key of the server 210.

In one embodiment, a report can be signed with this public key. As such, the server 210 may be the only server in the network 100 that may decrypt reported results. This can be efficient when, for example, an initial investigation should be complete without the need for further confirmation. If such a need arises, the server 210 may distribute a decrypted and redacted version of the reports (e.g., by removing any sensitive information). In another embodiment, a confirmation can be signed with the public key of the server 210, whereas the report may or may not be signed. If the report is not signed but the confirmation is, the servers may be enabled to confirm or disconfirm reported results, but only the server 210 may be able to decrypt the received confirmations and/or disconfirmations. In this case, since the server 210 may be the only server capable of decrypting the confirmed results, the server 210 may initiate corrective actions. Further, by tying a configuration file with a public key or some other identification of the server 210, the server 210 may transmit a command associated with that key or identification to terminate an analysis based on the configuration file and/or resulting reports.

As such, the network 100 can be configured to allow various servers to assume privileged roles associated with different analyses. For each analysis, each server may generate and share its report. How the remaining servers may use this report can be controlled using a public key of a corresponding privileged server. Similarly, for each analysis, each server may generate and share its confirmation. Here again, how the remaining servers may use these confirmations can be controlled by using a public key of a corresponding privileged server. The use of autonomous agents and, optionally keys, may allow each server to locally detect a particular behavior and activate other servers to try and confirm the behavior. This may allow automating intrusion detection across the network 100.

In some examples, the server 210 may, in some examples, provide network-based resources such as, but not limited to, applications for purchase and/or download, web sites, web hosting, client entities, data storage, data access, management, virtualization, etc. The server 210 may also be operable to provide web hosting, computer application development, and/or implementation platforms, or combinations of the foregoing to client devices.

The server 210 may be any type of computing device such as, but not limited to, a mobile phone, a smart phone, a personal digital assistant (PDA), a laptop computer, a desktop computer, a server computer, a thin-client device, a tablet PC, etc. The server 210 may also contain communications connection(s) that allow server 210 to communicate with a stored database, other computing devices or server, client devices, and/or other devices on a network. The server 210 may also include input/output (I/O) device(s) and/or ports, such as for enabling connection with a keyboard, a mouse, a pen, a voice input device, a touch input device, a display, speakers, a printer, etc.

Additionally, in some embodiments, the server 210 may be executed by one more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the server 210 may include one or more servers, perhaps arranged in a cluster, or as individual servers not associated with one another.

In one illustrative configuration, the server 210 may include at least one or more processing units (or processor devices(s)) and one memory. The processor device(s) may be implemented as appropriate in hardware, computer-executable instructions, firmware, or combinations thereof. Computer-executable instruction or firmware implementations of the processor device(s) may include computer-executable or machine-executable instructions written in any suitable programming language to perform the various functions described.

The memory may store program instructions that are loadable and executable on the processor device(s), as well as data generated during the execution of these programs. Depending on the configuration and type of the server 210, the memory may be volatile (such as random access memory (RAM)) and/or non-volatile (such as read-only memory (ROM), flash memory, etc.). The server 210 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to FIG. 3, that figure illustrates an example configuration file 310 and an example report 320 associated with a computing node of a network, such as the server 210 of the network 100. The configuration file 310 and the report may generally be any types of documents and may follow any formats. For example, each may be a TXT, XML, JSON, or some other electronic document. The configuration file 310 may include various fields that can be used by the agent 220 of the server 210 to analyze the dataset 230 and generate the report 330.

In particular, the configuration file 310 may include an identification 312 field. This field may be optional as indicated in FIG. 3 with dashed lines. The identification 312 may represent a unique identifier of the configuration file 310. The agent 220 may use the identification 312 in various ways. For example, the agent 220 may record the identification 312 such that, if the server 210 receives the configuration file 310 in a subsequent communication, the agent 220 can determine that the configuration file 310 may have already been processed and need not be processed again. The identification 312 may also be tied to an identification of a privileged computing node that may have initiated the configuration file 310. For example, the identification 312 may take the form of "ABC-123," where "ABC" may be a unique identifier of the configuration file and "123" may be a unique identifier of the privileged computing node. This may allow the agent 220 to identify the privileged computing node and, as necessary, encrypt the report 330 or portions of the report 330 with a public key of the privileged computing node.

The configuration file 310 may also include an interpretation 314 field. This field may identify which field(s) in a local dataset should be considered or may indicate an initial condition that should be met to initiate the analysis. For example, if the configuration file 310 is generated to investigate logs of web requests, the interpretation 314 may specify a source IP address field or some other field in the logs. As such, if the dataset 230 includes a source IP address field, the agent 220 may analyze the associated entries. In a similar example, the interpretation 314 may indicate that the logs should be analyzed only if the source IP address field exists, although the analysis may encompass this and/or other fields of the logs. In this example, if the dataset 230 includes a source IP address field, the agent 220 may determine that the dataset 230 should be analyzed.

The configuration file 310 may also include a heuristic 316 field. This field may define parameters for analyzing certain portions of the dataset. For example, the heuristic 316 may specify that, if a dataset includes the interpretation field 314, that field and/or some other fields in the dataset should be analyzed according to the parameters. In an embodiment, the heuristic 316 may define what behavior should be checked in the dataset, a relevancy associated with observing the behavior, and/or an action that should be initiated if the behavior is observed. To illustrate and referring back to the web request example, the heuristic 316 may specify a series of checks including: (1) if the source IP address field is found, analyze the source IP address entries and the accessed content entries in the logs logged within a time range, (2) if the source IP address entries exceed a certain number, generate fuzzy or locality-sensitive hashes of the accessed content entries, (3) compare the generated hashes, (4) if a generated hash is different from other generated hashes by a certain degree (e.g., a threshold or percentage), generate a report and include in the report the generated hash and a corresponding source IP address entry. As such, if the server 210 includes a web server, the agent 220 may determine that the first check may be met, may process the remaining checks, and may accordingly generate the report 330.

As illustrated, the server 210 may access the configuration file 310, accordingly analyze the dataset 230, and generate the report 330. In particular, the agent 220 may parse the configuration file 310 and perform a number of actions 320 based on the fields of the configuration file 310. For example, the agent 220 may record the identification 312 in a log if not previously recorded. Or if previously recorded, the agent 220 may ignore the configuration file 310. Further, the agent 220 may cause the server 210 to further distribute the configuration file 310, depending on the network topology. For example, in a point-to-point topology, the server 210 may transmit the configuration file 310 to the next server. In this topology, the agent 220 may update the configuration file 310 to include a unique identifier of the server 210. In this way, a privileged computing node (and other computing nodes in the network) may determine that the server 210 may have already processed the configuration file and, thus, need not receive the configuration file 310 again. In addition, the agent 220 may use the identification 312 to identify the privileged computing node and to protect, as applicable, the report 330 or a portion thereof using a public key of the privileged computing node.

The actions 320 may also include the agent 220 using the interpretation 314 and heuristic 316. For example, the agent 220 may determine whether the dataset 230 includes a field corresponding to the interpretation 314. If so, the agent 220 may proceed with processing the heuristic 316. Otherwise, the agent 220 may ignore the configuration file 310. The actions 312 associated with the heuristics may include analyzing the dataset 230 based on the defined parameters and/or checks and generating the report 330 accordingly.

Turning to the report 330, the report 330 may be generated by the agent 220 based on the configuration file 310. The report may include a number of fields associated with the analysis of the dataset 230 based on the configuration file 310. For example, the report 330 may include a report identification 332 field. This field may be optional as indicated in FIG. 3 with dashed lines. The report identification 332 may represent a unique identifier of the report 330. In an embodiment, the report identification 332 may be associated with the identification 312 of the configuration file 310 and/or the server 210 that may have generated the report 330. For example, if the configuration file 310 and the server 310 have unique identifiers of "ABC-123" and "xyz," respectively, the report identification 332 may be "ABC-123-xyz" or some other combination of the identifiers. This may allow computing nodes further analyzing the report 330 to easily identify the associated configuration file 310 and the associated server 210.

The report 330 may also include an observation 334 field. This field may summarize the analysis performed by the agent 220 based on the heuristic 314. For example, the observation 334 may represent the observed behavior resulting from the analysis. In an embodiment, the observation 334 may capture this behavior as data resulting from the analysis according to the heuristic 316. To illustrate and continuing with the previous web request example, the observation 334 may include a number of fuzzy or locality sensitive-hashes and corresponding source IP addresses.

Additionally, the report 330 may be protected with a public key 336 of the privileged computing node that may have initiated the analysis based on the configuration file 310. This protection may be optional as indicated in FIG. 3 with dashed lines. For example, the configuration file 310 may include an additional field indicating whether the report 330 should be encrypted or not.

In an embodiment, the agent 220 may expand the configuration file 310 to include the report 330. As the configuration file 310 is transmitted from one computing node to the other, the configuration file 310 may be expanded to cumulatively contain reports. This type of configuration file may be implemented in any network topology, including in a point-to-point network. Further, doing so may reduce the number of reports that may be transmitted over the network by, for example, cumulatively including the reports in the same configuration file transmitted between the computing nodes. Additionally, doing so may simplify tracking which computing node may have already processed the configuration file by having that information in the configuration file and may simplify the processing of the reports based on the cumulative nature of the configuration file.

Turning to FIG. 4, that figure illustrates an example confirmation 410 associated with a computing node of a network, such as the server 210 of the network 100. The confirmation 410 may generally be any type of document and may follow any format. For example, the confirmation 410 may include a TXT, XML, JSON, or some other electronic document. Further, the server 210 may generate the confirmation 410 based on a processed report 330. Typically, this report may be a report received from another computing node, rather than the report generated by the server 210 itself. That is the case because, if the server 210 generated the report 330, there may be no value-added to confirm an already reported observation of the server 210.

As such, for the illustrative purpose of FIG. 4, although the described report and corresponding fields use the same numbering as the ones from FIG. 3, that numbering indicates the same type of report rather than the same report already generated by the server 210.

In particular, the server 210 may receive the report 330 from another computing node. In turn, the agent 220 may parse the report and retrieve the information from the various fields. For example, the agent 220 may determine if the report is encrypted with a public key 336 of a privileged computing node. If so, the agent 330 may not be capable of decrypting the report 310 and, thus, may ignore the report 310. Otherwise, the agent may determine the report identification 332. If this identification has already been recorded, agent 220 may determine that the report 310 may have been previously processed and, thus, may ignore the report 310. Otherwise, the agent 220 may record the report identification 332 and further process the report 310.

Processing the report may include performing various actions 420 using an observation 334 from the report 310. The type of actions 420 to be performed may be defined in the report 330, in a configuration file 310 (e.g., a heuristic 316 or some other file) associated with the report, or may be coded in the agent 220. In particular, the agent 220 may compare the observation 334 to the dataset 230 to find matches. If matches are found, the agent 220 may generate a confirmation 410 and may cause the server 210 to distribute the confirmation 210 to other computing nodes in the network. What constitutes a match may be defined as parameters associated with the actions 420. For example, the heuristic 316 of the configuration file 310 may define that the observation 334 can be matched to an entry or entries in the dataset 230 if differences between the observation 334 and the entry or entries are similar to a certain degree or within a certain range. To illustrate and continuing with the example of the web requests from FIG. 3, the observation 334 may include a fuzzy or locality-sensitive hash of an accessed content. The agent may compare this observed hash to fuzzy or locality-sensitive hashes of accessed content entries in the dataset 230. If the hashes are similar enough (e.g., the degree of similarity exceeds a threshold or, conversely, the degree of dissimilarity is less than a threshold), the agent 220 may determine that there may be matches and accordingly generate the confirmation 410.

Turning to the confirmation 410, the confirmation 410 may be generated by the agent 220 based on the report 330. The confirmation 410 may include a number of fields associated with the analysis of the dataset 230 based on the report 330. For example, the confirmation 410 may include a confirmation identification 412 field. This field may be optional as indicated in FIG. 4 with dashed lines. The confirmation identification 412 may represent a unique identifier of the confirmation 410. In an embodiment, the confirmation identification 412 may be associated with the report identification 332 of the report 330 and/or the server 210 that may have generated the confirmation 410. For example, if the report 330 and the server 310 have unique identifiers of "ABC-123-xyz" and "456," respectively, the confirmation identification 412 may be "ABC-123-xyz-456" or some other combination of the identifiers. This may allow computing nodes further analyzing the confirmation 410 to easily identify the server 210 that may have generated the confirmation 410, the associated report 330, the computing node that may have generated the report 330, and the configuration file 310.

The confirmation 410 may also include a message 414 field. This field may summarize the analysis performed by the agent 220 based on the observation 334. For example, the message 414 may represent a confirmation (or disconfirmation) of whether the reported observation 334 may have also been observed in the dataset 230. To illustrate and continuing with the previous web request example, the message 414 may include a yes statement indicating that the reported fuzzy or locality sensitive-hashes may have also been observed in the dataset 230.

The confirmation 410 may further include a count 416 field. This field may be optional as indicated in FIG. 4 with dashed lines. The count may cumulatively track the number of computing nodes that may have confirmed (or disconfirmed) the reported observation 334. For example, a first server may have generated and provided the report 330 to a second server. This second server may have processed the report 330 and determined that the behavior 334 may have been observed. Accordingly, the second server may have generated a confirmation with a count of "one." Next, the second server may have provided the report 330 with the associated confirmation to the server 210. In turn, the server 210 may generate the confirmation 414 with the count 416 set to "two" to indicate that two servers may have cumulatively confirmed the observation 334 so far.

Additionally, the confirmation 410 may be protected with a public key 336 of the privileged computing node that may have initiated the analysis based on the configuration file 310. This protection may be optional as indicated in FIG. 4 with dashed lines. For example, the configuration file 310 or the report 330 may include an additional field indicating whether the confirmation 410 should be encrypted or not.

In an embodiment, similarly to and independent of or in conjunction with the expansion of the configuration file, the agent 220 may expand the report 330 to include the confirmation 410. As the report 330 and/or configuration file 310 is transmitted from one computing node to the other, the report 330 and/or configuration file 310 may be expanded to cumulatively contain confirmations. Doing so may reduce the number of confirmations that may be transmitted over the network and may simplify tracking which computing node may have already processed the report 330.

Figure 5:
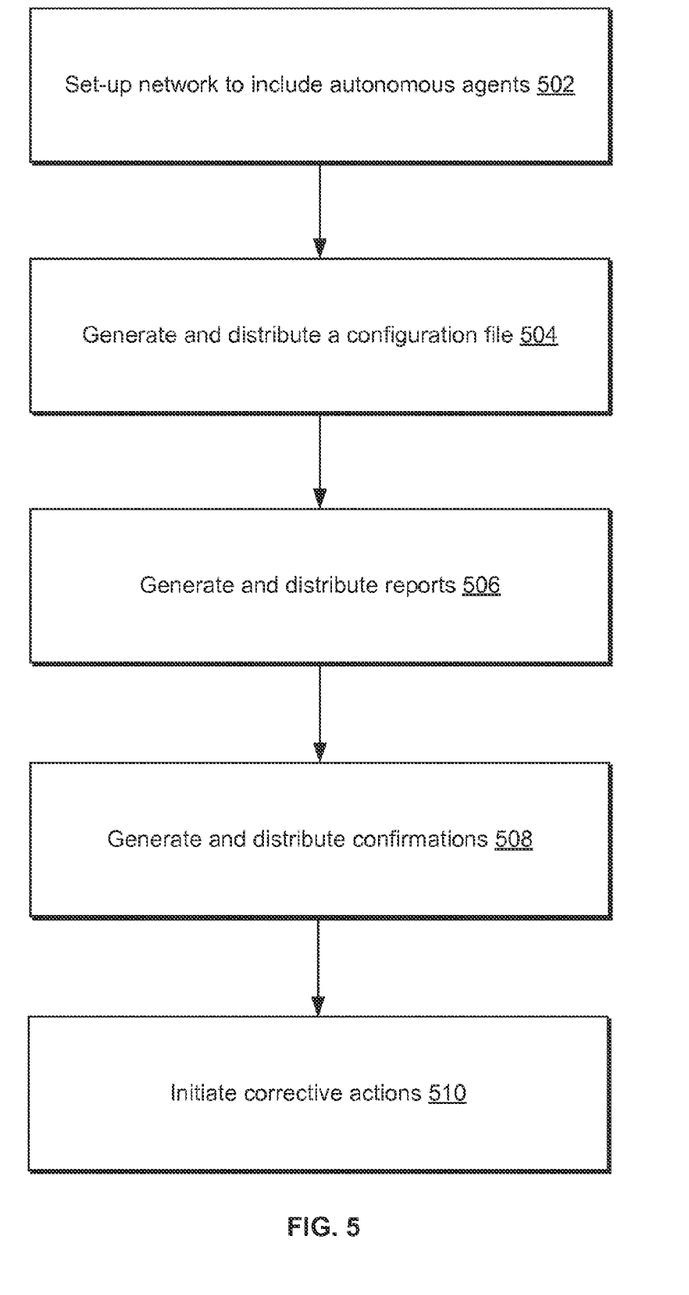
FIG. 5 illustrates an example flow for detecting a behavior in a network of computing nodes, according to embodiments.
Figure 6:
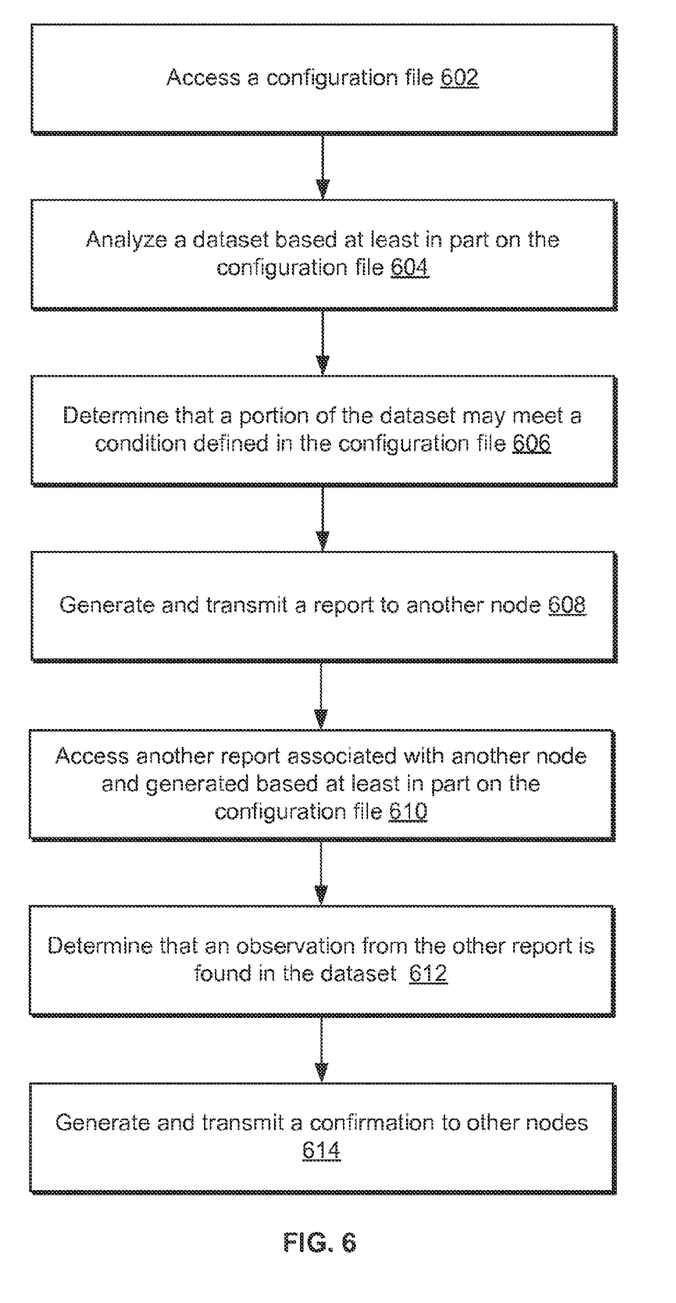
FIG. 6 illustrates a more detailed example flow for detecting a behavior in a network of computing nodes, according to embodiments.

Turning to FIGS. 5-6, those figures illustrate example flows for analyzing local datasets and correlating resulting observations. FIG. 5 illustrates an example flow for performing such analyses and correlations across a network. In comparison, FIG. 6 illustrates a more detailed example flow for a computing node on the network to perform an analysis and correlations. Operations of the example flow of FIG. 5 may be further embodied in operations of the example flow of FIG. 6. Thus, some operations may be similar. Such similarities are not repeated herein in the interest of clarity of explanation.

Further, in the illustrative operations, each of the operations or functions may be embodied in, and fully or partially automated by, modules executed by one or more processor devices of a computing node. For example, autonomous agents and other modules executed on computing nodes may perform certain operations of the flows. Nevertheless, other or a combination of other and modules may be additionally or alternatively used. Also, while the operations are illustrated in a particular order, it should be understood that no particular order is necessary and that one or more operations may be omitted, skipped, and/or reordered.

The example flow of FIG. 5 may start at operation 502, where a network may be set-up to include autonomous agents. For example, autonomous agents may be installed on computing nodes of the network. Further, communication protocols and a network topology may be implemented. The various computing nodes may be peers to each other and any computing node may communicate with one or more other computing nodes according to the network topology. The autonomous agents may be configured to analyze local datasets of the corresponding computing nodes to detect particular observations. The autonomous agents may further be configured to share these observations for further analysis against the local datasets to confirm or disconfirm the observations. In an embodiment, the autonomous agents may be configured to process configuration files, reports, and confirmations.

There may be a large number of computing nodes in the network. Each of these computing nodes may process multiple configuration files, generate multiple reports, process multiple reports, and generate multiple confirmations. As such, there may be a large number of messages or a large amount of associated data that may be exchanged between the computing nodes over the network. If this network is also configured to carry other types of traffic, constraints may be imposed on bandwidth usage and priority to reduce the risk of exceeding the network capacity. For example, the exchange of reports may have a lower priority than other types of network. In comparison, confirmations indicating a potential network-based issue may be given a higher priority. Similarly, the amount of exchanged data in association with the analysis (e.g., reports) and correlations (e.g., confirmations) may be throttled to a certain amount based on various factors. These factors may include priority of other traffic, time of day, a committed quality of service for traffic over the network, and/or other network-based factors. The priority and/or throttling mechanism may be additionally or alternatively imposed at a computing node level. For example, depending on the types of services provided by a computing node and the traffic in and out of the computing node, priority and throttling may be imposed on the traffic associated with the analysis and/or correlations.

At operation 504, a configuration file may be generated and distributed. For example, an administrator may use a computing device to generate the configuration file and may transmit the configuration file to a particular computing node. In another example, the administrator may directly use the particular computing node to generate the configuration file. This node may be designated as a privileged node and may start the analysis process by initiating the distribution of the configuration file to the other computing nodes of the network. Depending on the network topology, the configuration file may, for example, be distributed from one computing node to the next or broadcasted to all the computing nodes.

At operation 506, reports based on the configuration file may be generated and distributed. For example, a computing node that may receive the configuration file may analyze its local dataset based on an interpretation field and a heuristic field from the configuration file. According, the computing node may generate a report and distribute the report to the other computing nodes. The report may include a result of the analysis indicating an observed behavior. Based on the size of the dataset and/or the scope of the desired analysis, an approximation method may be specified in the heuristic to efficiently and quickly analyze the entries in the dataset. For example, the heuristic may define a degree of similarity against which matches in the dataset may be measured. For instance, for logs of web requests, the heuristic may recommend using fuzzy or locality-sensitive hashes and may set the degree of similarity at a predefined range.

Various techniques may be implemented to distribute the report depending on the network topology. For example, if the computing node is configured to transmit the configuration file to a next computing node, the computing node may also transmit the report with, but separate from, the configuration file, with an expanded version of the configuration file, or subsequent to transmitting the configuration file. In another example, if the network topology supports a broadcast mode, the computing node may broadcast the report to the other computing nodes. Further, the report can be protected with a public key of a privileged computing node associated with the corresponding configuration file.

At operation 508, confirmations based on a report may be generated and distributed. For example, a computing node that may receive the report may analyze its local dataset to confirm or disconfirm the observed behavior identified in the report and accordingly generate a confirmation. Based on the size of the dataset and/or the scope of the desired correlation, an approximation method may be specified in the report or the associated configuration file heuristic to efficiently and quickly analyze the entries in the dataset, similarly to what is described in connection with operation 506.

Various techniques may also be implemented to distribute the confirmation depending on the network topology. For example, if the computing node is configured to transmit the report to a next computing node, the computing node may also transmit the confirmation with, but separate from, the report, with an expanded version of the report, or subsequent to transmitting the report. In another example, if the network topology supports a broadcast mode, the computing node may broadcast the confirmation to the other computing nodes. In comparison to distributing reports between nodes, the distribution method may be the same or be different for the confirmations. For example, if the network supports point-to-point and broadcast protocols, point-to-point communications may be used to distribute the reports, whereas broadcast communications may be used to distribute the confirmations. That may be the case because confirmations may indicate a network-related issue and, therefore, may have a higher priority to flood the network. Further, the confirmation can be protected with a public key of a privileged computing node associated with the corresponding configuration file.

At operation 510, corrective actions may be initiated. For example, a privileged computing node that may have initiated an analysis based on a configuration file may receive related reports and confirmations from the various computing nodes in the network. Based on the reported behavior(s) and/or the number of computing nodes that may have confirmed the behavior(s), the privileged computing node may initiate one or more corrective actions. For example, if a reported behavior indicates high risk network issues, the privileged computing node may void traffic to and from the reporting computing node, effectively taking that computing node offline pending further investigation. In another example, if a reported behavior is confirmed by only a few number of the computing nodes (e.g., below a certain threshold such as five percent), the privileged computing node may determine that this behavior may be unique to reporting and confirming computing nodes rather than being common across the network. Accordingly, the privileged computing node may determine that a network-related issue may exist.

Various corrective actions may be initiated. These actions may include, for example, one or more of initiating another more specific analysis and/or correlation based on another configuration file, collecting additional data, or terminating an existing analysis and/or correlation.

Turning to FIG. 6, that figure illustrates an example flow for analyzing a dataset to observe a behavior and to further analyze the dataset to confirm or disconfirm a reported behavior. An autonomous agent may be configured to perform some or all of the operations of the example flow. Generally, an operation may be thought of as belonging to a stage of a multiple stage flow. For example, in one stage, various operations may be performed to observe the behavior from a local dataset based on a number of parameters. In another stage, the observed behavior may be confirmed or disconfirmed across other datasets based on another number of parameters.

The example flow of FIG. 6 may start at operation 602, where an agent implemented on a computing node may access a configuration file. For example, the computing node may receive the configuration file from another or a privileged computing node. The configuration file may define different parameters against which a dataset local to the computing node should be analyzed. These parameters may be specified as interpretation and heuristic fields.

At operation 604, the agent may analyze the local dataset based at least in part on the configuration file. For example, the agent may ascertain whether the configuration file may have been previously processed. This may be done by comparing an identification of the configuration file to recorded logs of processed configuration files. If previously processed, the agent may ignore the configuration field. Otherwise, the agent may ascertain whether a field identified in the interpretation field of the configuration file may exist in the local dataset. If not, the agent may ignore the configuration file. Otherwise, the agent may analyze this field and/or other fields using the heuristic field of the configuration file.

At operation 606, the agent may determine that a portion of the local dataset may meet a condition defined in the configuration file. For example, the fields identified in the configuration file and found in the local dataset may be analyzed based on the parameters and checks specified in the heuristic field. To efficiently and quickly complete the analysis and based on the scope of the analysis, an approximation method may be implemented as described herein above. If a certain condition set by the parameters and checks is met (e.g., a fuzzy hash may be different from other fuzzy hashes by a certain degree), the agent may determine that a certain behavior may be observed and may generate a summary of this observation (e.g., the dissimilar fuzzy hash).

At operation 608, the agent may generate a report based at least in part on the analysis and may cause the computing node to transmit the report to another computing node. The report may include, for example, data about the observation. The transmission may include, for example, transmitting the report to a next computing node or to a subset of the computing nodes in the network for further processing and transmission to the other computing nodes, or broadcasting the report to the other computing nodes.

At operation 610, the agent may access another report. This report may have been generated by another computing node based at least in part on another configuration file and may include an observation of a behavior detected by this other computing node. The report may be received from this other computing node or from yet another computing node that may sit in between. The report may be provided with or as part of the associated configuration file, or may identify this configuration file. Further, the report may include other confirmations generated by other computing nodes in response to the report and confirming the reported behavior.

At operation 612, the agent may determine that the observation reported in the report may be found in the local dataset of the computing node. For example, the agent may match the observation to various entries in the local dataset. This matching may use an approximation method as describe herein above. If the observation is matched, the agent may confirm that the observation may also be detected in the local dataset.

At operation 614, the agent may generate a confirmation based at least in part on the match. The confirmation may include information indicative of the match and, as applicable, of a count of other computing nodes that may have also confirmed the observation. The agent may cause the computing node to transmit the confirmation to other computing nodes of the network. For example, the confirmation may be transmitted separate from or as part of the report and/or the associated configuration file. The transmission may include, for example, transmitting the confirmation to a next computing node or to a subset of the computing nodes in the network for further processing and transmission to the other computing nodes, or broadcasting the confirmation to the other computing nodes.

Figure 7:
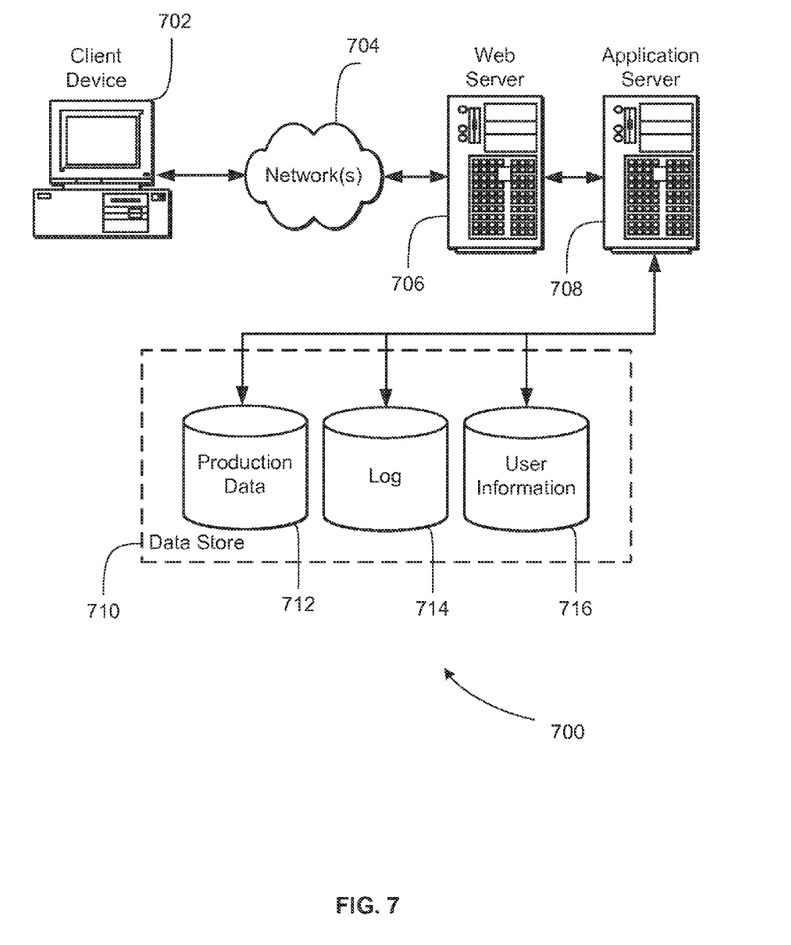
FIG. 7 illustrates an environment in which various embodiments can be implemented.

Turning to FIG. 7, the figure illustrates aspects of an example environment 700 capable of implementing the above-described structures and functions. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network(s) 704 and convey information back to a user of the device. Examples of such client devices include personal computers, cell phones, handheld messaging devices, laptop computers, set-top boxes, personal data assistants, electronic book readers, or any other computing device. The network(s) 704 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, and the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server 708 provides access control services in cooperation with the data store 710, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers 706 and 708 are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store 710 illustrated includes mechanisms for storing production data 712 and user information 716, which can be used to serve content for the production side. The data store 710 is also shown to include a mechanism for storing log data 714, which can be used for reporting, analysis, or other such purposes. It should be understood that there can be many other aspects that may need to be stored in the data store 710, such as for page image information and to access correct information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the client device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of environment 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specifications and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    distributing, by a computer system, a configuration file to a plurality of nodes forming a point-to-point network, the plurality of nodes comprising a plurality of corresponding local datasets and a plurality of corresponding local agents, the plurality of corresponding local agents configured to analyze the plurality of corresponding local datasets based at least in part on the configuration file, the configuration file identifying data fields of a dataset to be analyzed according to a condition and an action to be performed if the condition is met, the computer system maintaining a privileged node of the plurality of nodes, the configuration file indicating that confirmations are to be protected with a public key associated with the privileged node and independently indicating whether reports are to be protected with the public key;
    receiving, by the computer system, a report from a node of the plurality of nodes, the report based at least in part on an analysis of the configuration file by a corresponding local agent of the node, the report indicating that analyzed data fields from a corresponding local dataset of the node meet the condition, the report comprising a summary of the analyzed data fields, the report received based at least in part on the action, the report protected using the public key in accordance with the indication in the configuration file;
    receiving, by the computer system, a confirmation from each of a set of nodes of the plurality of nodes, the confirmation indicating that a local dataset of the node comprises data associated with the summary, the confirmation received based at least in part on the action, individual confirmations protected using the public key in accordance with the indication in the configuration file such that non-privileged nodes of the plurality of nodes are unable to access protected content of the confirmation;

comparing, by the computer system, a count of the set of nodes from which confirmations were received to a threshold; and determining, by the computer system, that the node is associated with a network-based issue based at least in part on the count being lower than the threshold.

2. The computer-implemented method of claim 1, wherein the plurality of corresponding local agents comprise a plurality of autonomous agents, wherein a first autonomous agent of a first node analyzes a first local dataset of the first node based at least in part on the configuration file and independently of an analysis of a second local dataset of a second node by a second autonomous agent of the second node.

3. The computer-implemented method of claim 1, wherein the plurality of nodes comprise web servers, wherein the plurality of corresponding local datasets comprise local logs associated with client access to the web servers, wherein the data fields identified in the configuration file comprise Internet protocol (IP) address fields in the local logs, wherein the condition comprises a frequency of IP addresses, and wherein the action comprises generating a locality-sensitive hash of traffic associated with the IP addresses and transmitting the locality-sensitive hash to the remaining nodes.

4. The computer-implemented method of claim 1, wherein the node comprises a web server, and wherein determining that the node is associated with a network-based issue comprises determining that the web server is under a network attack based at least in part on determining that the count is lower than the threshold.

5. One or more non-transitory computer-readable storage media storing computer-executable instructions that, when executed by a computing node configure the computing node to perform operations comprising:

accessing a configuration file comprising a condition, the configuration file comprising an indication that reports are to be protected with a public key of a privileged computing node communicatively coupled with the computing node;

determining that a portion of a local dataset meets the condition;

generating a report based at least in part on meeting the condition, the report protected using the public key of the privileged computing node in accordance with the indication in the configuration file;

accessing a second configuration file and a second report that is associated with a second computing node, the second report generated based at least in part on the second configuration file and comprising an observation associated with a second local dataset of the second computing node, the observation indicating that a second portion of the second local dataset meets a second condition from the second configuration file, the second configuration file comprising a second indication that messages are to be protected with the public key of the privileged computing node;

analyzing the local dataset to determine whether the observation associated with the second local dataset is also associated with the local dataset; and generating a message indicative of an association between the local dataset and the observation based at least in part on the analyzing, the message protected using the public key of the privileged computing node in accordance with the second indication in the second report.

6. The one or more computer-readable storage media of claim 5, wherein the configuration file comprises a heuristic field and an interpretation field.

7. The one or more computer-readable storage media of claim 6, wherein the interpretation field is used to determine whether the dataset includes a particular field, and wherein the heuristic field is used to determine whether an included particular field meets the condition.

8. The one or more computer-readable storage media of claim 5, wherein the report comprises identification configured to enable the computing node to identify the configuration file.

9. The one or more computer-readable storage media of claim 5, wherein the message comprises identification configured to enable the computing node to identify the second configuration file.

10. The one or more computer-readable storage media of claim 5, wherein the report is unprotected with a public key of a privileged node configured to distribute configuration files, and wherein the message is protected with the public key of the privileged node.

11. The one or more computer-readable storage media of claim 5, wherein analyzing the local dataset to determine whether the observation is associated with the local dataset comprises determining a degree of similarity between data in the local dataset and the observation and declaring that the observation is associated with the local dataset based at least in part on a comparison of the degree of similarity to a threshold.

12. The one or more computer-readable storage media of claim 5, wherein the computer-executable instructions that, when executed by the computing node, further configure the computing node to perform operations comprising:

tracking a number of messages generated based at least in part on the configuration file; and determining that a network-based issue exists based at least in part on the number of messages.

13. The one or more computer-readable storage media of claim 12, wherein the message comprises a cumulative count of computing nodes comprising local datasets associated with the observation.

14. A system, comprising:

a memory configured to store computer-executable instructions; and a processor configured to access the memory and execute the computer-executable instructions to collectively at least:

transmit, to a first system and a second system, a configuration file comprising a condition, the configuration file indicating that confirmations are to be protected with a public key associated with the system and independently indicating whether reports are to be protected with the public key;

receive, from the first system, a report comprising an observation indicative of the condition being met in a first dataset local to the first system, the report protected using the public key in accordance with the indication in the configuration file;

receive, from the second system, a confirmation that the observation is associated with a second dataset local to the second system, the confirmation protected using the public key in accordance with the indication in the configuration file; and determine that the condition is associated with an issue based at least in part on the confirmation.

15. The system of claim 14, wherein the configuration file causes the first system to transmit the report to the second system, and wherein the report causes the second system to transmit the confirmation to the system.

16. The system of claim 15, wherein the system is a privileged node in a point-to-point network, and wherein the first system and the second system are unprivileged nodes in the point-to-point network.

17. The system of claim 16, wherein the privileged node is configured to perform one or more of: generate the configuration file, initiate a transmission of the configuration file to the first system, instruct the first system to terminate a process for generating the report, or instruct the second system to terminate another process for generating the confirmation.

18. The system of claim 15, wherein determining that the condition is associated with an issue comprises: determining a count of systems that have provided the confirmation, comparing the count to a threshold, and detecting the issue based at least in part on the comparison.

19. The system of claim 14, wherein the computer-executable instructions when executed on the processor further cause the system to at least initiate a corrective action based at least in part on the issue.

20. The system of claim 14, wherein the corrective action comprises one or more of: generate and transmit a second configuration file based at least in part on the confirmation or void traffic to the first system and second system.

* * * * *